United States Patent
Zaum et al.

(10) Patent No.: US 10,767,989 B2
(45) Date of Patent: Sep. 8, 2020

(54) METHOD AND DEVICE FOR DETECTING A LIGHT-EMITTING OBJECT AT A TRAFFIC JUNCTION FOR A VEHICLE

(71) Applicant: Robert Bosch GmbH, Stuttgart (DE)

(72) Inventors: Daniel Zaum, Sarstedt (DE); Holger Mielenz, Ostfildern (DE); Jan Rohde, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/183,164

(22) Filed: Nov. 7, 2018

(65) Prior Publication Data
US 2019/0162532 A1  May 30, 2019

(30) Foreign Application Priority Data
Nov. 29, 2017  (DE) .................. 10 2017 221 465

(51) Int. Cl.
*G01C 3/08* (2006.01)
*G01V 8/10* (2006.01)
*G06K 9/00* (2006.01)

(52) U.S. Cl.
CPC .................. *G01C 3/08* (2013.01); *G01V 8/10* (2013.01); *G06K 9/00825* (2013.01); *G06K 2209/23* (2013.01)

(58) Field of Classification Search
CPC ... G01C 3/08; B60R 1/06; G08G 1/16; G06K 9/00825; G01S 17/02; G05D 1/0088
See application file for complete search history.

(56) References Cited

U.S. PATENT DOCUMENTS

| | | | | |
|---|---|---|---|---|
| 5,796,094 A | * | 8/1998 | Schofield | B60N 2/002 250/208.1 |
| 2009/0184844 A1 | * | 7/2009 | Faber | G06K 9/00825 340/937 |
| 2015/0117715 A1 | * | 4/2015 | Murao | G06K 9/00825 382/104 |
| 2016/0259984 A1 | * | 9/2016 | Zhang | G06K 9/00825 |
| 2016/0291154 A1 | * | 10/2016 | Nehmadi | G01S 17/08 |
| 2017/0019976 A1 | * | 1/2017 | Rajagopalan | G01S 17/003 |
| 2017/0253181 A1 | * | 9/2017 | Choi | B60Q 9/008 |
| 2018/0180708 A1 | * | 6/2018 | Vijaya Kumar | G01S 19/51 |

OTHER PUBLICATIONS

Pairoj Saengpredeekorn, "A New Technique to Define the Overtake Distance Using Image Processing", 2009 IEEE (Year: 2009).*
Mark Hinchliffe, "How riders can have high visibility" :https://nnotorbikewriter.com/how-riders-can-become-more-visible/ Nov. 22, 2015 (Year: 2015).*

* cited by examiner

*Primary Examiner* — Maurice C Smith
(74) *Attorney, Agent, or Firm* — Norton Rose Fulbright US LLP; Gerard Messina

(57) ABSTRACT

A method for detecting a light-emitting object at a traffic junction for a vehicle, the method including a reading in in which the light signal is read in which represents at least one chronologically changing light range of a light-emitting object. Furthermore, the method includes determining in which a driving parameter of the light-emitting object is determined using the light signal. Finally, the method includes providing, a detection signal being provided using the driving parameter and the detection signal representing a presence and/or an approach of the light-emitting object.

13 Claims, 2 Drawing Sheets

METHOD AND DEVICE FOR DETECTING A LIGHT-EMITTING OBJECT AT A TRAFFIC JUNCTION FOR A VEHICLE

RELATED APPLICATION INFORMATION

The present application claims priority to and the benefit of German patent application no. 10 2017 221 465.1, which was filed in Germany on Nov. 29, 2017, the disclosure which is incorporated herein by reference.

FIELD OF THE INVENTION

The present invention is directed to a device or a method according to the definition of the species in the independent claims. One object matter of the present invention is also a computer program.

BACKGROUND INFORMATION

Methods for recognizing and detecting moving and/or dynamic objects are known which are essentially based on actively detecting the contours of approaching vehicles with the aid of vehicle-mounted LIDAR, radar or video systems. In most cases, the objects thus detected are associated with a driving lane and their significance for one's own vehicle is derived therefrom. Based on this, a corresponding driving response may be planned and implemented for highly automated vehicles.

SUMMARY OF THE INVENTION

Against this background, a method for detecting a light-emitting object at a traffic junction for a vehicle, furthermore a device which uses this method, as well as finally a corresponding computer program according to the main claims are presented with the approach presented here. The measures listed in the dependent claims make advantageous refinements of and improvements on the device described in the independent claim possible.

An approach and/or a presence of a light-emitting object at a traffic junction is detected by a vehicle using the chronologically changing light cone of the light-emitting object and the light cone is analyzed with regard to a velocity and movement direction of the light-emitting object.

A method for detecting a light-emitting object at a traffic junction for a vehicle is provided, the method including the following steps:
reading in a light signal which represents at least one chronologically changing light range of a light-emitting object;
determining a driving parameter of the light-emitting object using the light signal;
providing a detection signal using the driving parameter which represents a presence and/or an approach of the light-emitting object.

A light-emitting object may, for example, involve an approaching vehicle, i.e. a passenger car, a truck, or a motorcycle. A traffic junction may involve, in particular, but not exclusively, an intersection of two traffic ways, for example streets. A vehicle may, for example, involve a highly automated vehicle for transporting persons, in particular which represents an intermediate step between assisted driving in the case of which the driver is assisted by numerous driver assistance systems in his/her driving task, and autonomous driving in the case of which the vehicle drives autonomously and without any interaction on the driver's part. For example, a light signal may represent at least one chronologically changing light range of a light-emitting object. A light range may, for example, involve a conical light range emanating from a light source, for example a headlight. In particular, the light range may involve an illuminated area on a traffic way, for example a street, especially in the case of which the light source itself is not recognizable. A driving parameter, which is determined according to one specific embodiment in the step of determining, may, for example, involve a velocity, a movement direction, a movement trajectory and/or a position of a light-emitting object. A detection signal may, for example, represent a presence and/or an approach of a light-emitting object.

According to one specific embodiment, a frequency of the chronologically changing light range may be read in in the step of reading in and a type of the light-emitting object may be ascertained using the frequency in the step of providing. In the present case, a frequency may be understood to mean a time period of a cyclic change, which is for example short-term, of a parameter, for example a light intensity, of a subrange of the light range. With the aid of the frequency of the changing light range, it is possible to draw a conclusion regarding the light-emitting object itself. For example, the light range of a headlight of a motorcycle which would carry out a rapid passing maneuver upon approaching an intersection would behave differently than the low-beam cone of a truck or a bus.

According to one specific embodiment, a geometry of the light range may be read in in the step of reading in and a detection signal may determine a position of the light-emitting object on a roadway surface in the step of determining or providing using the geometry of the light range. A geometry may, for example, be understood to mean a shape or a polygon. The chronologically changing light range may be detected in the video image of a video system of the highly automated vehicle and analyzed with regard to its geometry on the roadway surface, for example, whereby the light range and thus the light-emitting object may be assigned to a specific roadway.

According to one specific embodiment, a shape of the changing light range may be read in in the step of reading in and a type of the light-emitting object may be ascertained in the step of determining or providing using the shape of the light range. The thus detected geometric range of the shape is assigned a vehicle coordinate system and a time stamp, for example, so that repeating shapes of the light range may be examined with regard to their contours and their geometric positions. The chronological changes may thus be used to make assumptions about the velocity and the direction vector of the light emitting object.

One specific embodiment of the approach presented here is furthermore advantageous in which a velocity, a movement direction, a movement trajectory and/or a position of the light-emitting object is determined as a driving parameter in the step of determining. Such a specific embodiment of the approach presented here yields the advantage of a particularly good possibility of predicting the presence of the object based on the ascertained conclusive parameters.

According to one specific embodiment, a light signal, which represents a light range without a light source of the light-emitting object, may be read in in the step of reading in, the detection signal, which represents a presence and/or an approach of the light-emitting object concealed from sight, being provided in the step of providing. One advantage of such a specific embodiment of the method is an improved detection of approaching vehicles at traffic junctions, in particular in traffic situations which represent a visual obstruction of an affected driving lane for the highly automated vehicle and in which only a late detection of the light-emitting object would otherwise be possible with the aid of the on-board sensors of the highly automated vehicle.

According to one specific embodiment, a light signal, which represents at least two chronologically changing light ranges of a light-emitting object, may be read in in the step of reading in. It is possible to classify an object type with the aid of the number of the chronologically changing light ranges of a light-emitting object. In this way, the presence of either a passenger car or a truck may be deduced from at least two chronologically changing, emitted light ranges. In contrast, the presence of a motorcycle or a bicycle may, for example, be deduced from only one chronologically changing light range.

With the aid of the above-described approaches of the method for detecting a light-emitting object at a traffic junction for a vehicle, the light range of an approaching vehicle may be deduced by detecting differences in illumination as well as from shapes, which may indicate low beams, of the emitted light range, for example a conical shape and its association with the driving lane. A thus ascertained presence or absence of a further vehicle at a traffic junction may be used as a further source of information for computing a surroundings model of a highly automated vehicle, for example.

This method may, for example, be implemented in software or hardware or in a mix of software and hardware, for example in a control unit.

The approach presented here furthermore provides a device which is configured to carry out, control or implement in appropriate units the steps of one variant of the method presented here. This embodiment variant of the present invention in the form of a device also makes it possible to achieve the object underlying the present invention rapidly and efficiently.

For this purpose, the device may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit potentially being a flash memory, an EEPROM, or a magnetic memory unit. The communication interface may be configured to read in or output data in a wireless and/or wired manner, a communication interface, which is able to read in or output data in a wired manner, may read in these data electrically or optically, for example, from a corresponding data transmission line or output these data into a corresponding data transmission line.

In the present case, a device may be understood to mean an electrical device which processes sensor signals and outputs control and/or data signals as a function thereof. The device may have an interface which may be configured using hard- and/or software. In the case of a hardware configuration, the interfaces may, for example, be a part of a so-called system ASIC, which includes various functions of the device. It is, however, also possible that the interfaces are independent, integrated circuits or are at least partially made up of discrete components. In the case of a software configuration, the interfaces may be software modules which are present on a microcontroller in addition to other software modules, for example.

A computer program product or a computer program having program code is also advantageous, which may be stored on a machine-readable carrier or a memory medium, such as a semiconductor memory, a hard disk memory, or an optical memory, and is used to carry out, implement and/or control the steps of the method according to one of the specific embodiments described above, in particular when the program product is run on a computer or a device.

Exemplary embodiments of the approach presented here are illustrated in the drawings and elucidated in greater detail in the following description.

DETAILED DESCRIPTION

Figure 1:
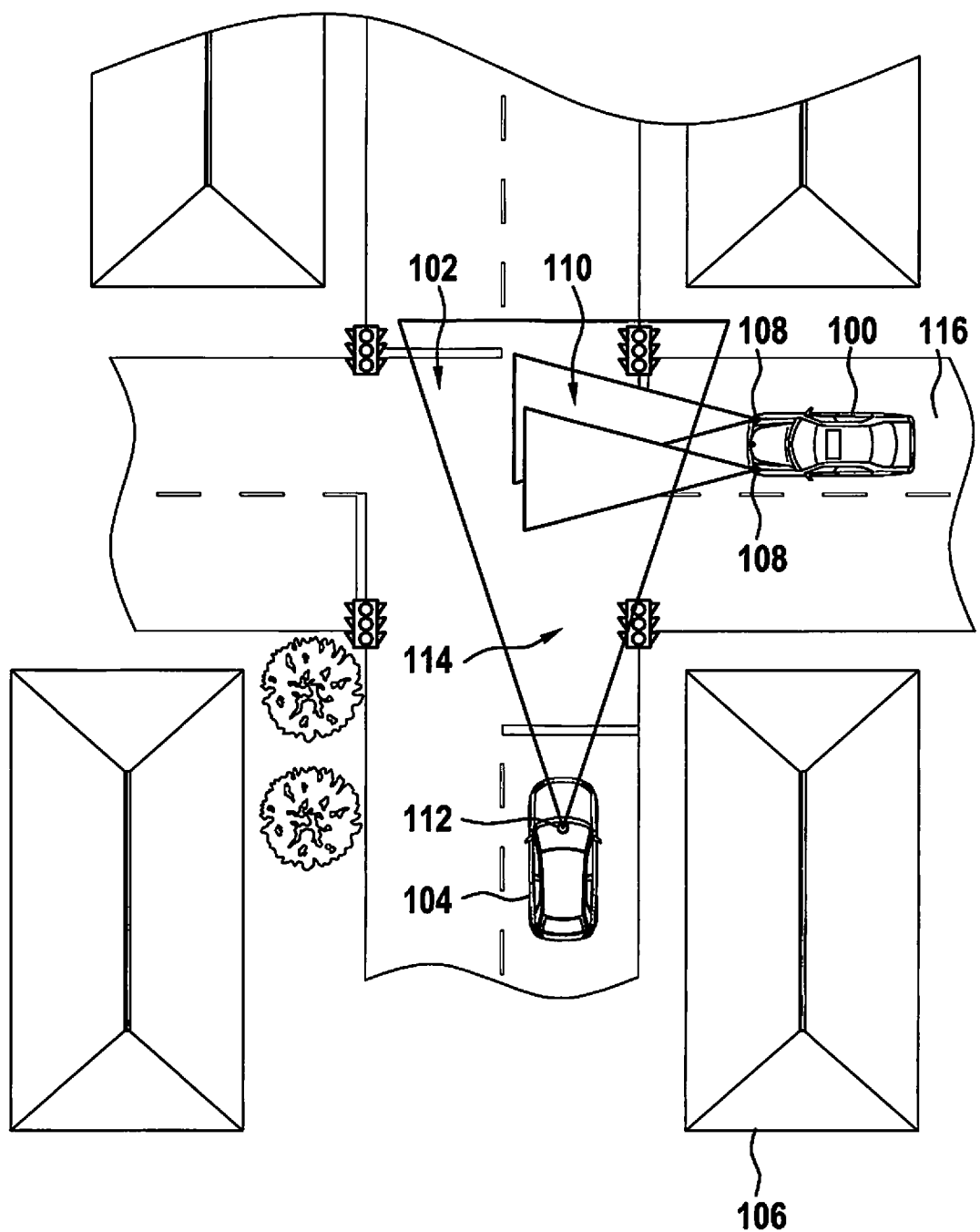
FIG. 1 shows a schematic top view of an exemplary traffic situation as an intersection to elucidate a method for detecting a light-emitting object at a traffic junction for a vehicle according to one exemplary embodiment.

In the following description of advantageous exemplary embodiments of the present invention, the elements which are illustrated in the various figures and appear to be similar are identified with identical or similar reference numerals; a repetitive description of these elements is dispensed with.

FIG. 1 shows a schematic top view of an exemplary traffic situation for using a method for detecting a light-emitting object 100 at a traffic junction 102 for a vehicle 104 according to one exemplary embodiment.

For illustration purposes, a traffic situation is illustrated in FIG. 1 as an intersection by way of example for using the method for detecting a concealed, light-emitting object 100 at a traffic junction 102: It is nighttime, or at least twilight, and vehicle 104, which may be in this case a highly automated vehicle, for example, is at a traffic junction 102. According to the exemplary embodiment illustrated here, traffic junction 102 is an intersection 102. According to one exemplary embodiment, light-emitting object 100, this object 100 being a further vehicle 100 as the other vehicle, in particular a passenger car, is at intersection 102 in a not directly visible area of highly automated vehicle 104. This not visible area is generated by a further object 106, for example a block of buildings 106 which blocks the view of highly automated vehicle 104 toward light-emitting object 100, being present between light-emitting object 100 and highly automated vehicle 104.

The two headlights 108 of light-emitting object 100 are switched on and cast a light range 110 into the surroundings, light range 110 being shaped to form two light cones 110 according to one specific embodiment. Highly automated vehicle 104 includes a vehicle-mounted surroundings sensor device 112 and has a visual range 114. Surroundings sensor device 112 may involve a video camera system 112 according to one exemplary embodiment. Highly automated vehicle 104 is not yet able to perceive approaching light-emitting object 100 within its visual range 114. It has, however, the capability of perceiving these differences in illumination and following them over time in the case of twilight and in the case that headlights 108 of light-emitting object 100 are likewise switched on. If the tracked movement direction of light range 110 corresponds to the given street geometries, which may be retrieved from a digital map, for example, the presence of another vehicle 100 may be assumed with maximum likelihood.

As described in the previous section, chronologically changing light ranges 110 of light-emitting object 100 which may be perceived via surroundings sensor device 112, which may be via a video system 112 in this case, of highly automated vehicle 104 are detected in a video image and analyzed with regard to their geometry on the roadway surface. The thus detected geometric range is assigned a vehicle coordinate system and a time stamp, for example, so that repeating shapes of light range 110 may be examined with regard to their contours and their geometric positions. The chronological changes may thus be used to make assumptions about the velocity and the direction vector of light-emitting object 100 which is perceived by highly automated vehicle 104. Furthermore, the frequencies of the changing shape of light range 110 also make it possible to draw conclusions about light-emitting object 100 itself. For example, light cone 110 of a motorcycle, which would potentially carry out a rapid passing maneuver upon approaching intersection 102, would behave differently than the low beam cone of a truck or a bus.

The method for detecting light-emitting object 100 at traffic junction 102 for highly automated vehicle 104 therefore shows in particular, but not exclusively, a presence, an absence or the approach of light-emitting object 100 at traffic junction 102. The presence and/or approach of light-emitting object 100 is detected in that a light range 110, a light cone 110 in this case, which may be assigned to a specific roadway 116 based on its geometry, builds up on a roadway 116 and in other elevated areas. Corresponding model assumptions with regard to the installation of low-beam lights in vehicles, the rigid assignment of the lights to the vehicle body, and their geometric configuration are used for these associations.

Figure 2:
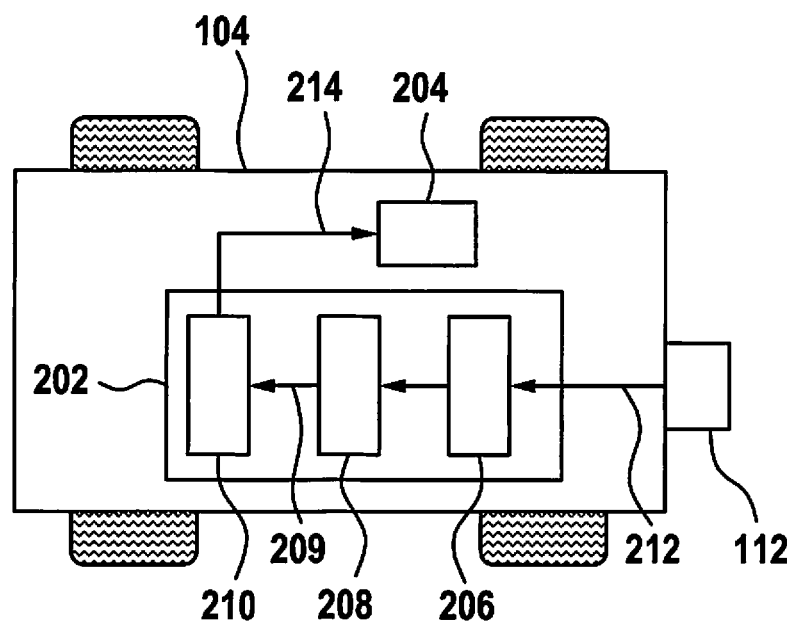
FIG. 2 shows a schematic top view of a vehicle including a device for detecting a light-emitting object at a traffic junction according to one exemplary embodiment.

FIG. 2 shows a schematic top view of a highly automated vehicle 104 having a device 202 for detecting a light-emitting object at a traffic junction according to one exemplary embodiment. Highly automated vehicle 104 may be highly automated vehicle 104 shown in FIG. 1, for example.

In addition to device 202 for detecting a light-emitting object at a traffic junction, highly automated vehicle 104 also includes surroundings sensor device 112 as well as a display device 204. Surroundings sensor device 112 is used to detect a visual range of highly automated vehicle 104 for the purpose of detecting other road users. Display device 204 is used to output a display or a warning to the driver of highly automated vehicle 104 about the presence of another, not visible road user at the traffic junction. Device 202 in turn includes a reading-in device 206, a determination device 208 as well as a provision device 210.

Reading-in device 206 is configured to read in a light signal 212. Light signal 212 represents in this case at least one chronologically changing light range of the light-emitting object. According to one exemplary embodiment, light signal 212 may also represent at least two chronologically changing light ranges of the light-emitting object. Determination device 208 is configured to determine a driving parameter 209 of the light-emitting object using light signal 212. Driving parameter 209 may involve, among other things, a velocity, a movement direction, a movement trajectory and/or a position of the light-emitting object, which are determined by determination device 208. Provision device 210 is configured to provide a detection signal 214 to display device 204 using driving parameter 209. Detection signal 214 represents in this case a presence and/or an approach of the light-emitting object.

Reading-in device 206 is furthermore configured to read in a frequency, which includes light signal 212, of the changing light range, provision device 210 being configured to ascertain a type of the light-emitting object, for example a motorcycle, a passenger car, or a truck, using the frequency. Reading-in device 206 is moreover configured to read in a geometry of the light range, which includes light signal 212, provision device 210 being configured to provide detection signal 214, which thus determines a position of the light-emitting object on the roadway surface, using the geometry of the light range.

The reading-in device is furthermore configured to read in a shape, which includes light signal 212, of the changing light range, provision device 210 being configured to ascertain a type of the light-emitting object using the shape of the changing light range. Reading-in device 206 is finally configured to read in light signal 212, light signal 212 representing a light range without a light source of the light-emitting object. Provision device 210 is configured in this case to provide detection signal 214 to display device 204 which displays a presence and/or the approach of the light-emitting object concealed from sight.

Figure 3:
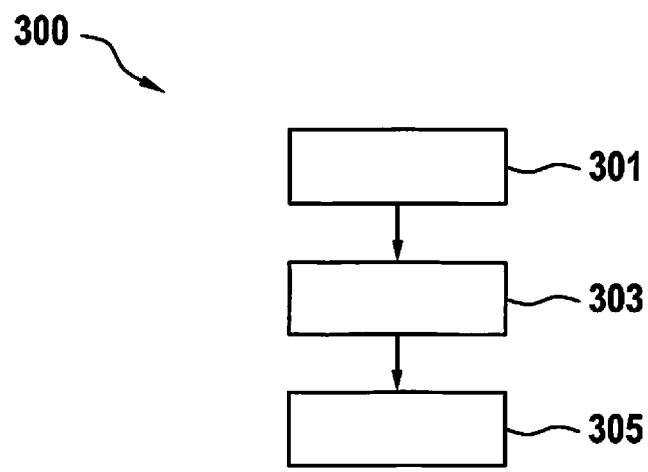
FIG. 3 shows a flow chart of one exemplary embodiment of a method for detecting a light-emitting object at a traffic junction for a vehicle according to one exemplary embodiment.

FIG. 3 shows a flow chart of one exemplary embodiment of a method 300 for detecting a light-emitting object at a traffic junction for a highly automated vehicle according to one exemplary embodiment. Method 300 may, for example, be carried out using the device of the highly automated vehicle described with reference to FIG. 2.

The method includes a step 301 in which the light signal is read in which represents at least one chronologically changing light range of a light-emitting object. Furthermore, a driving parameter of the light-emitting object is determined in a step 303 using the light signal. Finally, a detection signal is provided in a step 305 using the driving parameter, the detection signal indicating a presence and/or an approach of the light-emitting object.

If an exemplary embodiment includes an "and/or" linkage between a first feature and a second feature, this is to be read in such a way that the exemplary embodiment according to one specific embodiment includes both the first feature and the second feature and according to another specific embodiment it has either only the first feature or only the second feature.

What is claimed is:

1. A method for detecting a light-emitting object at a traffic junction for a vehicle, the method comprising:
   reading in a light signal which represents at least one chronologically changing light range of a light-emitting object;
   determining a driving parameter of the light-emitting object using the light signal;
   tracking over time, using the light signal, a movement direction light range;
   detecting, using the light signal, a presence of the light-emitting object at the traffic junction and/or detecting, using the light signal, an approach of the light-emitting object to the traffic junction;
   and
   based on the detecting of the presence of the light-emitting object at the traffic junction and/or based on the detecting of the approach of the light-emitting object to the traffic junction, providing a detection signal, using the driving parameter, which represents the presence of the light-emitting object at the traffic junction and/or the approach of the light-emitting object to the traffic junction;

wherein the detecting includes detecting, based on the movement direction and based on a digital map, the presence and/or the approach of the light-emitting object.

2. The method of claim 1, wherein a frequency of the changing light range is read in in the reading in and a type of the light-emitting object is ascertained in the determining or the providing using the frequency.

3. The method of claim 1, wherein a geometry of the light range is read in in the reading in and the detection signal is determined using the geometry of a position of the light-emitting object on a roadway surface in the determining or the providing.

4. The method of claim 1, wherein a shape of the changing light range is read in in the reading in and a type of the light-emitting object is ascertained in the determining or the providing using the shape of the light range.

5. The method of claim 1, wherein a velocity, a movement direction, a movement trajectory and/or a position of the light-emitting object is determined as a driving parameter in the determining.

6. The method of claim 1, wherein a light signal, which represents a light range without a light source of the light-emitting object, is read in in the reading in, the detection signal being provided in the providing, which represents the presence and/or the approach of the light-emitting object concealed from sight by an object adjacent to the traffic junction.

7. The method as recited in claim 6, further comprising:
displaying, on a display device of the vehicle, an indication of the presence and/or the approach of the light-emitting object concealed from sight by the object adjacent to the traffic junction.

8. The method of claim 1, wherein, in the reading in, a light signal, which represents at least two chronologically changing light ranges of a light-emitting object is read in.

9. The method as recited in claim 1, wherein the reading-in is performed at the traffic junction.

10. The method as recited in claim 1, wherein the traffic junction is an intersection of at least two streets, and the light-emitting object is a further vehicle, and wherein the detecting includes detecting: (i) the presence of the light-emitting object located on a different one of the streets than the vehicle and/or (ii) the approach of the light-emitting object located on the different one of the streets than the vehicle.

11. The method as recited in claim 10, wherein the light-emitting object is concealed from sight by an object adjacent to the traffic junction.

12. The method as recited in claim 10, wherein the detecting includes detecting the light-emitting object approaching the traffic junction from a first direction different than a direction at which the vehicle is traveling.

13. The method as recited in claim 1, wherein the detecting includes detecting, the presence and/or the approach of the light-emitting object, based on the tracked movement direction corresponding to a geometry of a street retrieved from the digital map.

* * * * *